Sept. 20, 1932.  W. E. SYKES  1,878,730
FLEXIBLE COUPLING
Filed Dec. 19, 1927
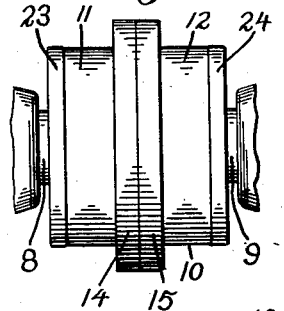
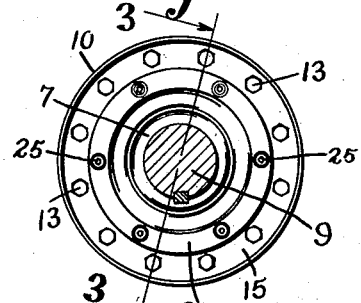
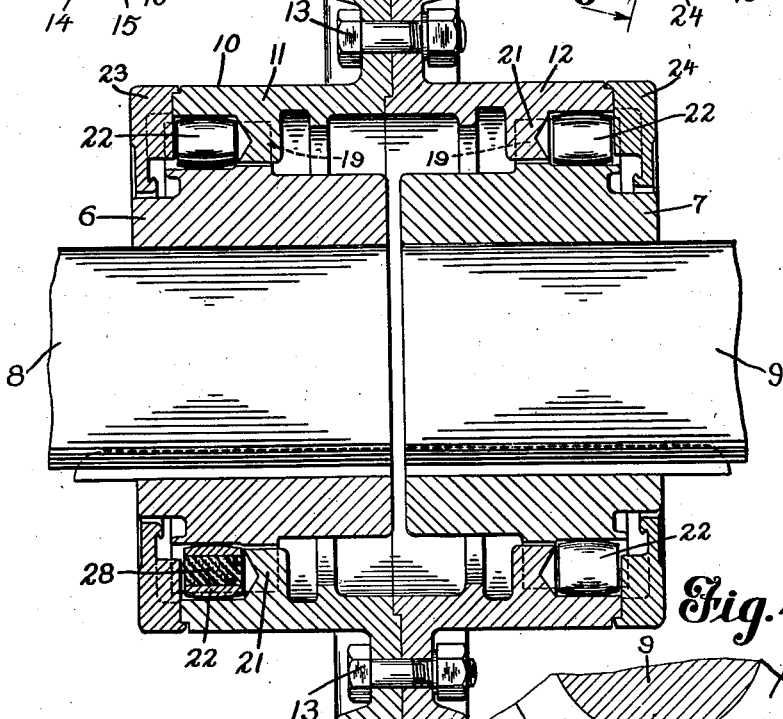
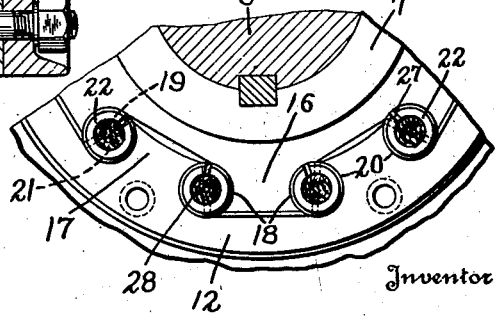
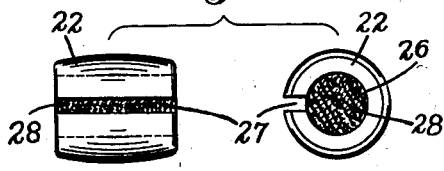

Patented Sept. 20, 1932

1,878,730

UNITED STATES PATENT OFFICE

WILLIAM E. SYKES, OF BUFFALO, NEW YORK

FLEXIBLE COUPLING

Application filed December 19, 1927. Serial No. 241,103.

This invention relates to flexible couplings, and more especially to couplings in which provision is made for freedom of movement between driving and driven members in order to take care of angular, axial or lateral displacement thereof, without transmitting undue strains or vibrations thereto, due to possible misalignment of these parts.

I have found that when couplings having more or less loose engaging members are used to transmit power where the torque is uneven, for instance, where they are used as a connection between alternating current motors and driven shafts, there results a hammer action between the engaging parts which, in the case of an alternating current motor, appears to correspond in frequency to the periodicity of the motor, and its amplitude is apparently affected by the load and the phase difference of the motor. In some cases, the looseness or backlash in the coupling is taken up or cushioned to a certain extent by a film of oil which forms on the engaging surfaces.

I have heretofore proposed the use of a flexible shaft coupling in which the driving and driven members comprise two rotatable shafts positioned end to end and in which the connection between the shafts is made by means of rolls which serve for the transmission of rotary movement from one shaft to the other, and which are disposed and retained in seatings located between hubs carried on the terminal portions of said shafts and a sleeve or casing surrounding the hubs.

In my prior construction, I prevent backlash or looseness between the operative parts of the coupling by providing rolls which have a tight fit in their races. When these rolls wear to any extent an oil film forms which cushions or dampens the hammer action. When balls are used in place of rolls and fit tightly into their races there is no backlash or hammer action so long as the balls do not wear, but when the balls become worn to any appreciable extent, the small areas of their surfaces in contact with the oil films formed in the races are insufficient to properly cushion the hammering.

I have found, therefore, that rolls are to be preferred to balls as connecting elements in couplings, but in order that dependence may not have to be placed on an oil film for cushioning the backlash, I contemplate a coupling in which looseness or wear is automatically taken up and no backlash occurs.

In a more specific aspect, the invention relates to a novel form of connecting element for couplings which automatically takes up and prevents any play occurring between it and the parts cooperating therewith.

It is highly desirable that couplings be torsionally resilient to some extent in order to take care of variations in the load or power transmitted therethrough without too much shock being transmitted to the parts of the coupling and the driven or driving means connected thereto. As an object of my invention I contemplate a flexible coupling of the above type which is torsionally resilient.

Another object of the invention is to provide a torsionally resilient flexible coupling which is resilient within the limits of the ordinary loads carried by the coupling, but in which means is provided for preventing the resilient portions of the coupling from becoming overstressed when an excessive load is carried thereby.

To these and other ends the invention consists in the novel features and combination of parts to be hereinafter described and claimed.

In the accompanying drawing,

Fig. 1 is an elevation of a coupling embodying the features of my invention;

Fig. 2 is an end view of the same;

Fig. 3 is a sectional view along line 3—3 of Fig. 2 but on an enlarged scale;

Fig. 4 is a fragmentary view, partly in section, and showing the interior arrangement of the coupling; and Fig. 5 shows the spring ring embodied in Figs. 3 and 4 on a somewhat larger scale.

The coupling shown in the drawing which I will now describe as a preferred embodiment of my invention comprises hubs or collars 6 and 7 mounted on opposing shaft ends 8 and 9, to which they will be keyed or otherwise securely fastened. Surrounding the hubs 6 and 7 and bridging the space between the ends of the shafts is a sleeve or casing 10, which is preferably divided transversely into two sections 11 and 12 secured together by bolts 13 passing through peripheral flanges 14 and 15 on the inner adjacent ends of sections 11 and 12.

The hubs 6 and 7 are provided on the outer portions of their peripheries with radial lugs or teeth 16 which are equally spaced circumferentially thereof, while sleeve sections 11 and 12 are provided with corresponding circumferentially spaced radial lugs or teeth 17 which enter the spaces between the lugs 16. The latter are provided in their opposite faces with axially extending semi-cylindrical grooves or races 18 terminating at a spaced interval from the inner ends of the lugs 16 to form abutments 19, while the sleeve sections 11 and 12 have similar axially extending substantially semi-cylindrical grooves 20 which terminate at a spaced interval from the inner ends of the lugs 17 to form abutments 21. The opposing grooves of the lugs together form cylindrical races for the reception of driving members herein shown in the form of spring rings or rolls 22 which impart rotary movement from one shaft to the other.

The abutments 19 and 21 form means for preventing the inward movement of the spring rings 22 while outward movement thereof is prevented by retaining rings 23 and 24 secured on the outer ends of sections 11 and 12 by suitable means as, for example, screws 25. As shown in the drawings, the cylindrical races are somewhat longer than the rings 22.

Each spring ring 22 is preferably made of spring steel or other material having a high degree of resiliency, and in the preferred form they are made substantially barrel shaped and provided with an interior bore 26 and a substantially axially extending opening or slit 27 passing from the exterior of the ring into the bore 26. In each of the bores 26 are oil felts or wicks 28.

In carrying out the invention, the spring rings 22 are placed in the cylindrical races under an initial compression. The rings may be readily introduced in their races under compression in the following manner: The hubs 6 and 7 are assembled in proper relationship to the sleeve sections 11 and 12 which are clamped together by bolts 13. The rings 22 are each driven into its respective race, the tapered portions on the outer surface of the rings forming means for guiding and compressing the rings as they are driven in. The openings or slits 27 are of such a width that these slits are substantially half closed when all of the spring rings are assembled in place. When the coupling is in use and one of the shafts connected thereto is driving the other, one of the rings 22 of each adjacent pair will be carrying the load, while the opposite rings will be substantially idle. If the load is such that the rings carrying it are compressed further closing the slits 27 therein, the remaining or idle rings will expand, due to their initial compression, and take up any backlash that might otherwise occur.

The expansion and contraction of the rings introduces oil into and expels oil from the felts in bores 26 keeping the rings thoroughly lubricated at all times.

It will be readily understood that all movement on the part of the rings 22, due to their compression by the load, takes place in a direction transverse to the axis of the rings, so that there is no tendency on the part of the latter to create longitudinal thrusts on the shafts or other elements connected thereto, and the elements co-operating with the rings, in the present case, the hubs 6 and 7, and sleeve 10, are permitted to have freedom of movement in an axial direction.

When the coupling is subjected to an overload, the rings carrying the load are compressed until the edges of the slits 27 are brought into engagement. The rings then become substantially unyielding and cannot become overstressed, as would be the case if there was othing to limit the amount they could be compressed. When the rings carrying the load are fully compressed in this manner the remaining or idle rings will have expanded substantially to their full diameters, thus taking up any play that might otherwise occur in the operative parts of the coupling.

The coupling is adapted to be made torsionally resilient under various loads simply by changing the spring rings. If light loads are to be carried, the torsional resiliency of the coupling may be increased by substituting more resilient rings; for instance, those made of material having a higher degree of resiliency or made out of the same material but having a larger bore.

It will, of course, be obvious that my improved power transmitting members in the form of spring rings will be equally useful in connection with two member couplings.

While I have shown and described a preferred embodiment of my invention, it is to be understood that the same is not to be limited to all the details shown but is capable of modification and variation within the spirit of the invention and the scope of the appended claims.

What I claim is:—

1. A resilient driving element for a flexible coupling, said element being substantially barrel-shaped, provided with an axially directed bore of relatively small diameter as compared to the external diameter of the element, and a generally axially directed slit extending into the bore and from end to end of the element, said slit being substantially parallel to the axis of the element.

2. In a coupling, a driving member, a driven member, said members having parts in opposed driving relation, and a power transmitting member between said parts, said member comprising a hollow steel roll having an axial bore and a slit extending from end to end of said roll and communicating with said bore and rendering said roll resilient transversely of the roll axis, the roll being substantially rigid in an axial direction.

3. In a coupling, driving and driven members having parts in opposed driving relation, and a separate power transmitting member interposed between said parts, and comprising a hollow elongated barrel-shaped metal roll having an axial bore and a slit extending from end to end of said roll and from the outer surface thereof to the interior of said bore, said roll being substantially rigid when compressed to bring the opposite sides of the slit into contact.

4. In a coupling, driving and driven members having substantially radial parts overlapping each other, and a power transmitting member freely interposed between said parts at the sides thereof, said member comprising a hollow roll having a substantially cylindrical axial bore of relatively small diameter as compared to the external diameter of the element extending from end to end, and a slit in the side wall of said roll passing through said side wall and extending in a generally longitudinal direction from one end of the roll to the other.

5. A driving element for a flexible coupling, said element being substantially barrel-shaped, provided with a bore, and means for rendering said element resilient within predetermined limits, said means comprising a slit in the side wall of the element extending into the bore and axially from one end of the element to the other, the sides of the slit contacting when the element is compressed a predetermined amount to limit the compression of the element.

In witness whereof, I have hereunto set my hand this 15th day of December, 1927.

WILLIAM E. SYKES.